(12) United States Patent
Heiland

(10) Patent No.: US 7,290,642 B2
(45) Date of Patent: Nov. 6, 2007

(54) MAGNETIC SPRING DEVICE WITH NEGATIVE STIFFNESS

(75) Inventor: Peter Heiland, Raunheim (DE)

(73) Assignee: Integrated Dynamics Engineering GmbH, Raunheim (DE)

( * ) Notice: Subject to any disclaimer, the term of this patent is extended or adjusted under 35 U.S.C. 154(b) by 0 days.

(21) Appl. No.: 10/430,795

(22) Filed: May 5, 2003

(65) Prior Publication Data

US 2003/0222383 A1 Dec. 4, 2003

(30) Foreign Application Priority Data

May 3, 2002 (DE) ................. 102 20 008

(51) Int. Cl.
*F16F 15/03* (2006.01)

(52) U.S. Cl. .................. 188/267; 188/378; 267/136

(58) Field of Classification Search ............... 267/150, 267/140.14, 140.15; 188/267, 378, 379, 188/380; 310/51; 335/285, 306

See application file for complete search history.

(56) References Cited

U.S. PATENT DOCUMENTS

| | | | | | |
|---|---|---|---|---|---|
| 3,842,453 | A | * | 10/1974 | Redfield | 5/643 |
| 4,314,623 | A | * | 2/1982 | Kurokawa | 188/267 |
| 4,724,923 | A | * | 2/1988 | Waterman | 181/208 |
| 5,319,275 | A | * | 6/1994 | Tozoni | 310/90.5 |
| 5,445,249 | A | * | 8/1995 | Aida et al. | 188/378 |
| 5,780,943 | A | * | 7/1998 | Ono | 310/12 |
| 6,260,676 | B1 | * | 7/2001 | Agnihotri et al. | 188/267.2 |
| 6,325,365 | B1 | * | 12/2001 | Fujita et al. | 267/140.15 |
| 6,505,718 | B2 | * | 1/2003 | Fujita et al. | 188/267 |
| 6,652,783 | B2 | * | 11/2003 | Fujita et al. | 264/35 |

FOREIGN PATENT DOCUMENTS

| | | | |
|---|---|---|---|
| EP | 0 767 321 A2 | | 4/1997 |
| FR | 1 302 481 | | 6/1961 |
| JP | 7-267192 A | * | 10/1995 |
| JP | 0 767 321 A | * | 4/1997 |
| JP | 2000346129 | | 12/2000 |
| JP | 2002-115742 A | * | 4/2002 |
| JP | 2002115742 | | 4/2002 |
| WO | WO 99/17034 | | 4/1999 |

OTHER PUBLICATIONS

MAT (machine assisted translation) of JP 2002-115742-A obtained from USPTO's STIC.*
European Search Report dated May 25, 2004.

* cited by examiner

*Primary Examiner*—Devon C. Kramer
*Assistant Examiner*—Mariano Sy

(57) ABSTRACT

A magnetic spring device with negative stiffness contains at least one first pole body combination composed of at least one first, at least one second and at least one third pole body, which each have opposite magnetic poles, with the pole bodies in the combination being aligned such that opposite poles are opposite one another and the first and the third pole bodies assume a defined distance from one another, in which the second pole body is arranged, with the pole bodies being arranged such that they can move relative to one another.

16 Claims, 12 Drawing Sheets

Fig. 4     Deflection z from the rest position
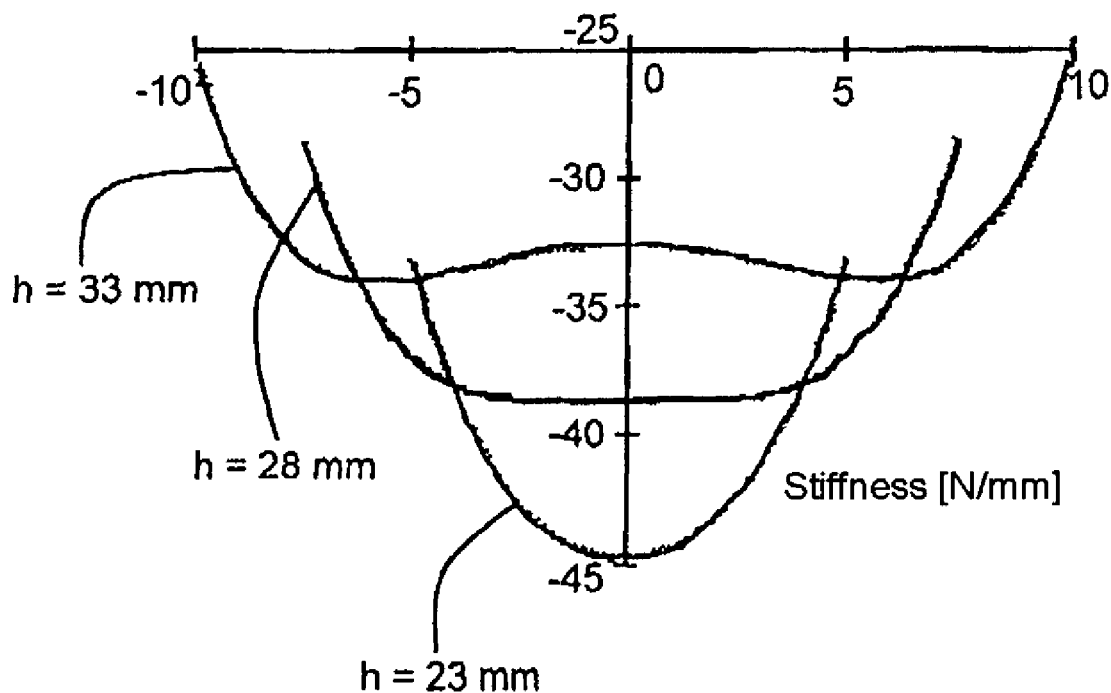
Fig. 5
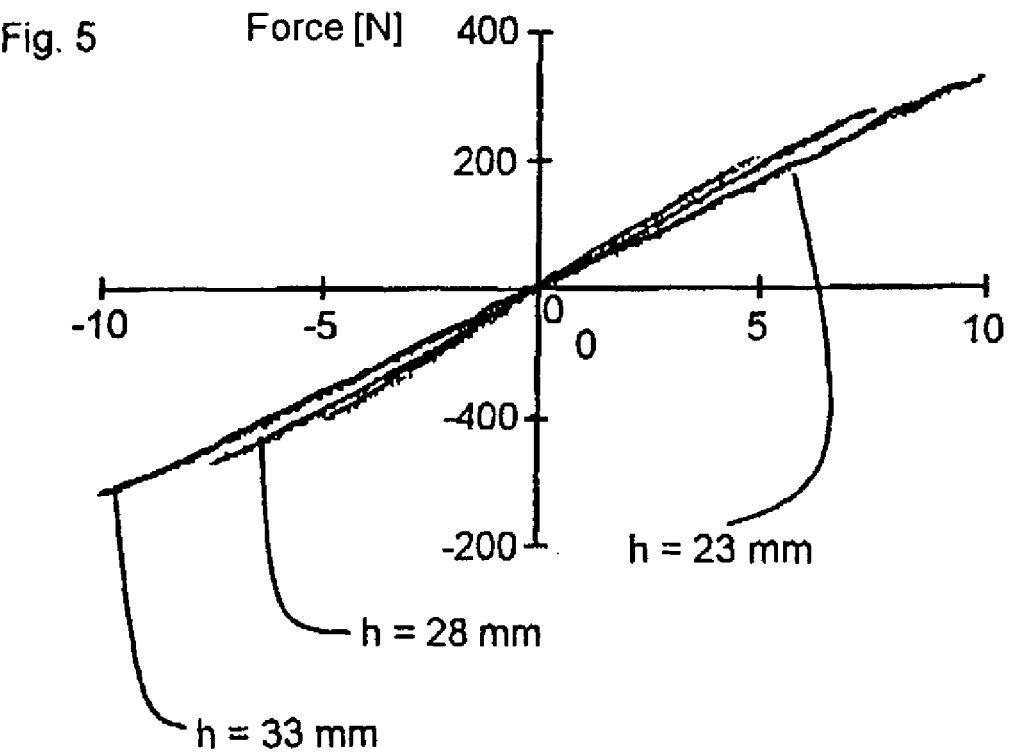

MAGNETIC SPRING DEVICE WITH NEGATIVE STIFFNESS

CROSS REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a magnetic spring device with negative stiffness and to an oscillation isolation device.

TECHNICAL FIELD

Magnetic springs are known which have a negative stiffness.

In this context, negative stiffness means that the force exerted by the spring on a spring body in the vectorial sense, starting from the rest position, increases in the direction of movement of the spring body, that is to say that the velocity vector of the spring body lies parallel to the spring force vector while, in contrast, in the case of positive stiffness, the velocity vector is aligned parallel to the spring force vector, but in the opposite direction.

A spring with negative stiffness is disclosed, for example, in EP 0 127 741 B2. This document describes a spring system for a motor vehicle, in which a combination of a magnetic spring with negative stiffness and a conventional spring with positive stiffness is used. The spring system is intended to be installed or connected between the unsprung mass parts and the sprung mass parts in a motor vehicle.

The design of the magnetic spring, which is referred to there as a correction spring, is distinguished by a system comprising two stacks of permanent magnets which are connected one behind the other and are separated from one another by soft iron pieces, with one of the magnet stacks being arranged such that it can move in the spring direction, and with the magnet stacks being opposite one another at the spring null point, such that identical poles come to rest in the vicinity of one another.

The principle of the correction spring, with the comparatively complicated design described above, is based on the fact that, with reference to the specific use of the spring in the spring system of an automobile, concentrated repulsion in the direction of movement is intended to be produced at the operating point of the spring system and corresponding to the zero crossing of the correction spring, in order in this way to achieve a correction spring with high negative stiffness, which is intended to lead to soft outward springing in conjunction with a correspondingly stiff positive spring, which thus has short spring movements.

Since the function of the spring is based on the repulsion effect of identical poles, even very small changes in the distance between the magnets and their position can lead to large variations in terms of the stability and characteristics of the spring. However, this has the consequence and the disadvantage that the spring disclosed in EP 0 127 741 B2 can be used only for certain purposes, to be precise in particular only where very precise regulation of the spring's thickness, or of other parameters of the spring, is not required. Such springs thus cannot be used, or can be used only to a very restricted extent, in particular, for example, in so-called vibration oscillation isolation systems for oscillation isolation of appliances such as microscopes which are sensitive to vibration.

DD-A-28186 likewise discloses a magnetic spring with negative stiffness, which can be installed in a motor vehicle spring system. In contrast to EP 0 127 741 B2, the negative stiffness of the spring according to this prior art is, in fact, not based on the repulsion effect of magnetic poles, but on the attraction effect of magnetic poles.

For this purpose, according to DD-A-28186, a magnetic armature composed of soft iron and with four projections at equal distances from one another is moved within a ring on whose inside four magnetic poles of alternate polarity are fitted, whose sizes and positions correspond to the projections, but in mirror-image form. The arrangement should be understood only in conjunction with the intended effect, namely of providing a spring system whose progressive effect during the spring process admittedly initially leads to a reduction in the spring stiffness, but in which, beyond a specific deflection from the null position, the stiffness, that is to say the positive stiffness, of the spring system actually increases further.

In order to accomplish this, when the system is in the initial position, the projections on the armature are located precisely between two poles and thus assume an unstable position with respect to the magnets. During the spring process, the armature is rotated from this position so that the projections move toward the poles, and are attracted by them. The negative stiffness that is produced in this case is, however, reversed at the instant at which the projections reach the position of the poles since, beyond this point, an additional force is required in order to rotate the projections, which are attracted by the magnets, back to the original position from the force field of the poles. In this way, the characteristic (which originally had a linear profile) of the helical spring which is connected in parallel with the magnetic spring is converted to a progressively running spring characteristic around the operating point of the spring system.

However, the exclusively nonlinear character of the spring is evident not only from the transition between positive and negative stiffness, but also from the fact that the magnetic force acting on the projections of the armature is not linear, but increases more than proportionally owing to the rotation with the increase in the overlap volume between the poles and the armature projections.

In particular, the generally nonlinear behavior of the spring very severely restricts the options for use of the spring, and makes it particularly unsuitable for use in other oscillation isolation systems.

SUMMARY OF THE INVENTION

The object of the invention is thus to provide a spring device and/or a spring with a negative characteristic, which, in particular, can be used in a flexible manner, has a simple design, can be adjusted specifically and, in the process, allows a linear characteristic to be set.

This object is achieved by a spring device according to the features of a magnetic spring device with negative stiffness including at least one first pole body combination composed of at least one first, at least one second and at least one third pole body, which each have opposite magnetic poles, with the pole bodies in the combination being aligned such that opposite poles are opposite one another and the first and the third pole bodies assume a defined distance from one another, in which the second pole body is arranged, with the pole bodies being arranged such that they can move relative to one another. Furthermore, the invention defines an oscillation isolation device in which the spring device according to the invention is used, in which the oscillation device for passive and/or dynamic oscillation of an isolationg body or of a load, in particular for vibration oscillation isolation, and in particular for oscillation isolation of apparatuses which are sensitive to oscillation, distinguished by at least one spring device.

According to the invention, a magnetic spring device with negative stiffness is provided, which contains at least one first pole body combination comprising at least one first, at least one second and at least one third pole body, which each have opposite magnetic poles, with the pole bodies in the combination being aligned such that opposite poles are opposite one another and the first and the third pole bodies assume a defined distance from one another, in which the second pole body is arranged, with the pole bodies being arranged such that they can move relative to one another.

The arrangement according to the invention of pole bodies in the spring device for the first time allows selective control of the magnetic stray field or field gradient between the pole bodies and, in particular, at the edges of the pole bodies or of the poles, which, according to Maxwell's equations, is responsible for the magnetic force effect on the pole bodies. This is because the inventor has been able to verify that, on the basis of the pole body combination according to the invention, selective adjustment of the field gradient is possible, with the capability in this case to linearize the field gradient and hence to achieve a magnetic spring device with essentially constant negative stiffness, with the distance between the first and the third pole body or pole being constant at a specific value.

In this case, the invention provides for at least two overlap volumes to be formed between the poles, in which case movement of the pole bodies relative to one another results in the enlargement of the one overlap volume and reduction of the other overlap volume. The functional relationship between the volume size of the one overlap volume and the other overlap volume offers the advantageous capability to improve considerably the linearity of the spring device according to the invention in comparison to the already known magnetic springs with negative stiffness. This is because a system with such a positive configuration makes it possible to compensate at least partially for the force effect of the second pole body or pole on the first pole body and the third pole body by means of the force of attraction from the other pole in the second apparatus in a defined manner, and to reduce it to the remaining stray field.

It is particularly advantageous for the sum of the overlap volumes to be essentially constant. In this case, the overlap volume which is present overall does not vary even when the second apparatus is moved relative to the first apparatus. This means that the magnetic reluctance within the spring device or the spring body remains essentially constant, so that the magnetic induction and the magnetic field strength essentially do not change, so that the force effect on the second apparatus is governed essentially just by the changing volumes at the edges of the overlap volumes, which overall leads to the spring body according to the invention having an improved linear response. In this context, it should also be stated that the invention advantageously provides that the pole bodies preferably move relative to one another such that the poles of the pole bodies are essentially moved along lines of force which originate from the poles.

The profile of the lines of force and hence of the stray fields is influenced predominantly by the pole geometries. According to the invention, the pole bodies have widely different geometries in order to define the stray fields. By way of example, reference is made in this context to a circular and/or annular and/or rectangular and/or square and/or corresponding cross section. Pole bodies may be particularly advantageous which have different sizes, despite having the same type of cross section wherever possible. This is because it has been identified for the purposes of the invention that the field gradient can be adjusted or manipulated particularly effectively when the cross-sectional size of the respective first and third pole body is varied with respect to that of the second pole body. In this case, it has been found to be particularly advantageous for the cross-section ratios between said pole bodies, that is to say between the respective first and third pole bodies and the respective second pole bodies, to be in a range between 100% and 300%, that is to say between 1:1 and 3:1. The range between 130% and 200% should be emphasized as being particularly preferable, with the ratio according to one preferred embodiment being 140%.

According to the invention, in particular for flexible adjustment of a defined spring stiffness, the spring device according to the invention advantageously comprises not only the first pole body combination but also a second or further pole body combinations, with the magnetic flux directions running parallel and/or parallel, but in opposite directions, to one another through the pole body combinations, in which case, according to one preferred embodiment, the magnetic flux directions run parallel to one another through the pole body combinations and, according to a further particularly preferred embodiment of the invention, the magnetic flux directions of adjacent pole body combinations run parallel, but in opposite directions to one another. In this case, the first of the embodiments has the further advantage that it allows a specific spring stiffness to be set particularly deliberately, and the second described embodiment offers the advantage that it allows spring devices with a comparatively hard stiffness to be produced and/or combined in a very simple manner.

Surprisingly, it is sufficient for the pole bodies or poles of the spring device or base cell according to the invention for this spring device or base cell to be formed from a combination of magnets and/or magnetic bodies, in which at least two poles are provided by one or more magnets. The invention thus furthermore offers the advantage that only a minimum amount of magnets with permanent poles need be used, and this may lead to a reduction in the production costs of the spring device according to the invention. Furthermore, this has the advantage that a pole body combination such as this is less sensitive, or is completely insensitive, to horizontal movements, that is to say movements at right angles to the movement direction of the pole bodies, between the magnetic poles.

In a further advantageous development of the [lacuna] according to the invention, the spring device according to the invention comprises at least one yoke for producing a focused magnetic circuit between the pole bodies. In this case the pole bodies, that is to say in particular the outer pole bodies, are in the form of the first and of the third pole body, to which the yokes are connected or to which they are attached, such that this results in a closed magnetic field flux.

The spring device according to the invention is very advantageously flexible with respect to the magnets which can be used in the pole bodies. This means that not only permanent magnets but also electromagnets or a combination thereof may be used.

Depending on the application, that is to say in particular with reference to the hardness of the spring, both ferroelectrically magnetically soft material and paramagnetic materials may be used for the pole bodies and/or for the yoke or yokes, that is to say materials whose relative permeability $mm_r$ is at least unity. Such materials include in particular iron and/or iron alloys and/or ceramics and/or non-ferrous metals and/or corresponding alloys.

For the purposes of a further advantageous development of the spring device according to the invention, the distance between the first and the third pole body, that is to say the distance between the outer pole bodies, is adjustable. According to the invention, this very advantageously makes it possible to set the stiffness of the spring in a flexible manner, in which case the spring device can at the same time be matched to the distance or distances at which the spring device has a constant stiffness or a linear force profile. For this purpose, the spring device according to the invention comprises a setting means, using which said pole body separation can be set precisely, in the millimeter range or below. Values of between 23 mm and 33 mm have been found to be preferred separation values between the pole bodies for the purposes of the invention. In order to produce a constant stiffness, it has been found to be particularly preferable to set the distance to a value of 28 mm.

Part of the spring device according to the invention is advantageously also a suitable holding means, using which the second pole body or central pole body can be held such that it can move at a distance between the outer pole bodies, or between the first and the third pole body. The holding means is preferably composed of a non-magnetic material or a material which cannot be magnetized.

In order to allow the central pole body (second pole body) to be guided essentially linearly at a distance, guidance means which essentially impede discrepancies from a linear movement are provided in the spring device according to the invention. For this purpose, the guidance means have spring means with positive stiffness, which hold the second pole body at a distance between the outer pole bodies, or between the first and third pole body, and are arranged in the form of a spring parallelogram. Leaf springs which form a parallelogram may be used, by way of example, as suitable spring means.

According to a further development of the invention, the spring device is equipped with a coupling means. The coupling means is preferably used for coupling and decoupling the spring device from and to a load or an isolation body and is stiff or rigid in the oscillation isolation direction, while being flexible at right angles to this direction. The coupling means is for this purpose split in two, and the decoupling is preferably achieved by means of a spring wire, which is arranged parallel to the oscillation isolation direction in the coupling means, and connects the two parts of the coupling means.

Furthermore, the spring device advantageously comprises a bracket device, which is preferably attached to the coupling means and by means of which the spring device can be attached to a load or the like.

The spring device according to the invention advantageously comprises possible additional shielding means, in order to ensure that the magnetic field produced in the spring device cannot penetrate the exterior.

A further advantage of the invention is also that the pole combination of the spring device according to the invention has no preferred direction in space, with regard to its use. This means that the movement direction of the pole bodies can be aligned in all spatial directions. This is because, if compensation is intended to be provided for gravitational forces in order to achieve a constant spring effect in all spatial directions, then this can be achieved by means of defined adjustment of the pole separations. In principle, the latter can be achieved both manually and by means of open-loop and/or closed-loop control, according to the invention.

It is of course advantageously possible for the spring device according to the invention to contain not only one pole body combination but a range of combinations connected in parallel and/or in series which, depending on the requirement profile, are coupled to one another such that they can be connected or combined in a variable manner, in order to make it possible to set different spring hardnesses.

In conjunction with a further very advantageous embodiment of the subject matter of the invention, the spring device according to the invention also comprises a suitable open-loop and closed-loop control device. The open-loop control device makes it possible to influence all the manipulated variables of the spring device or of the spring body. Influencing variables include, for example, the distance between the poles, the strength of the magnetic fields by, for example, the connection of a coil or by increasing the coil current, or by the connection of a further pole body combination, which makes it possible, inter alia, to control the relative position of the poles overall and/or the relative velocity and/or the relative acceleration between the poles during the spring process.

In order to complete the spring device, it may also comprise a spring body with positive stiffness for oscillation isolation. In this case, mechanical and/or pneumatic and/or hydraulic and/or electromechanical springs may optionally be used.

However, the invention relates not only to a spring device but equally and in addition to an oscillation isolation device for passive and/or dynamic oscillation isolation of an isolation body or of a load, in particular for vibration oscillation isolation, and in particular for oscillation isolation of apparatuses which are sensitive to oscillation, for example microscopes and corresponding instruments, in which a spring device according to the invention, as has been described above, is used. In this context, the spring device preferably has its natural position between the load and a stand surface. Other alignments may, of course, also be considered.

BRIEF DESCRIPTION OF THE DRAWINGS

The invention will be described in detail in the following text with reference to a number of figures. In this case, identical reference symbols relate to the same or corresponding features in the individual drawings. In the figures:

FIG. 4 shows a diagram which illustrates the negative stiffness as a function of the relative distance between the central pole body and the poles of the outer pole bodies as shown in FIG. 2 or 3, FIG. 5 shows the spring force profile for the respective pole body separation h from FIG. 4.

DETAILED DESCRIPTION OF THE INVENTION

Figure 1:
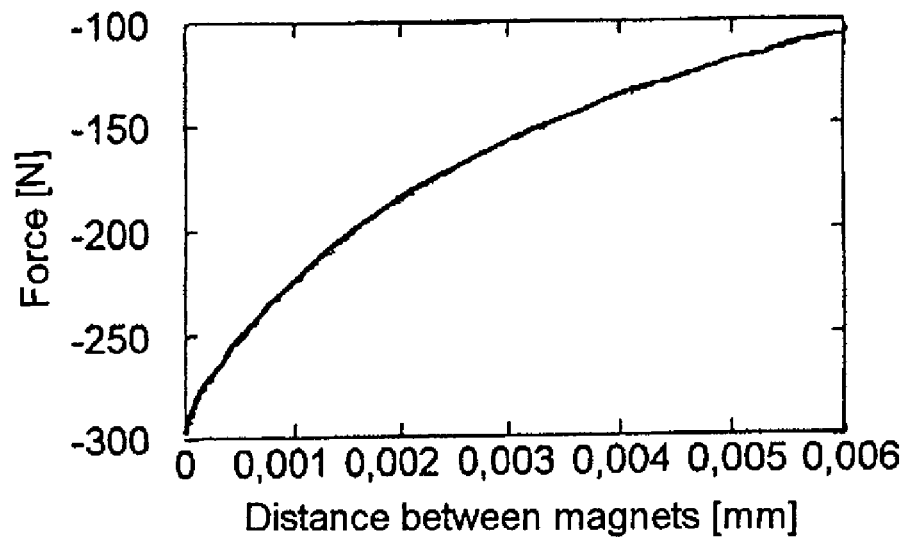
FIG. 1 shows a diagram illustrating the force/movement relationship of two mutually attracting poles.

FIG. 1 shows a characteristic which illustrates the rise in the attraction force between two mutually attracting magnets as a function of the distance between the magnets. In principle, the distance between the magnet poles is the sole governing parameter, when the magnets have a defined structure in terms of geometry and material. As those skilled in the art are aware, magnet poles of different polarity attract one another and, as can clearly be seen from FIG. 1 as well, the attraction force does not increase linearly as the separation decreases.

Owing to the increase in the force in the movement direction, the magnets experience a negative stiffness during their relative movement. The nonlinear force rise between two magnets as shown in FIG. 1 may be compensated for, for example, by a force being exerted on one of the magnets which counteracts the attraction force between the magnets. This will be described in more detail in the following text.

Figure 2:
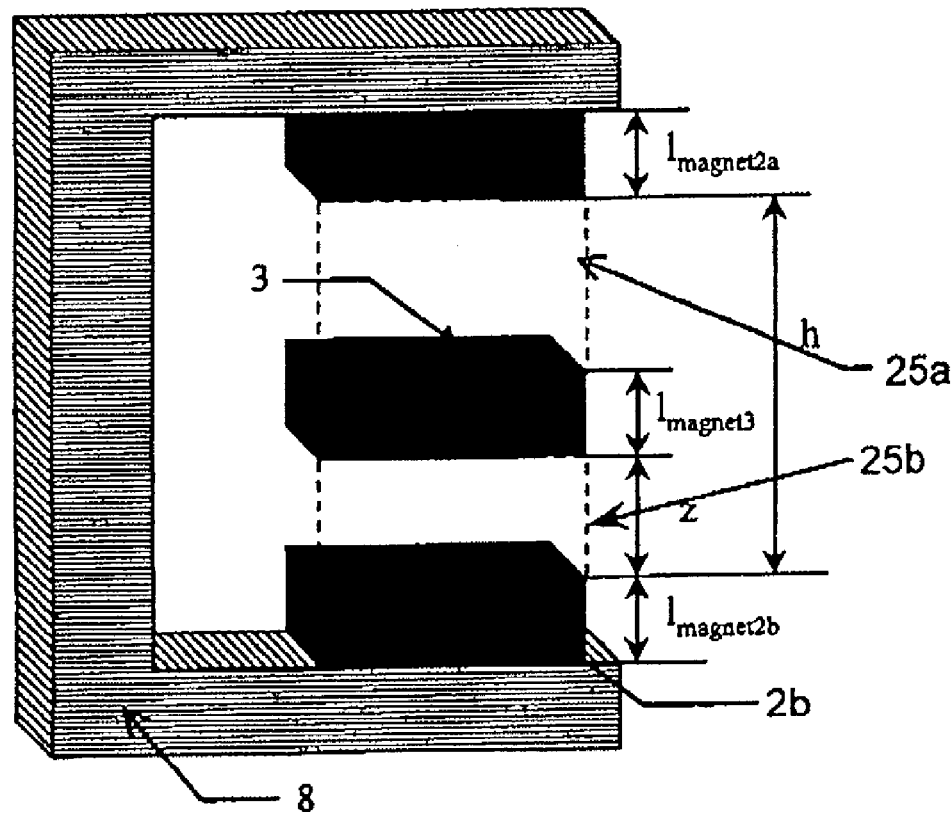
FIG. 2 shows a schematic illustration of a spring device according to the invention.

FIG. 2 shows a combination of magnetic pole bodies 2a, 2b, 3 and/or pole bodies 2a, 2b, 3 which can be magnetized, and which make it possible to linearize the attraction forces, in the sense of the invention, between the poles of the magnet bodies 2a, 2b, 3. The magnetic circuit comprises four basic elements. Firstly, the circuit has a gap 25, which is generally filled with air and sometimes may also contain a liquid which, like air, generally has a permeability of $mm_r \ggg 1$. Furthermore, the magnetic circuit has a soft iron yoke 8. The yoke is provided for focusing the magnetic lines of force in the magnetic circuit and is preferably composed of a ferromagnetic or ferrimagnetic material of high permeability ($mm_r \ggg 1000$), thus making it possible to achieve optimum focusing of the magnetic lines of force. In addition, the magnetic circuit contains three permanent magnets 2a, 2b, 3 with a high coercivity force or two magnetic coils, for producing a magnetic field, with at least two of the permanent magnets which have been mentioned being required in order to produce the magnetic field required according to the invention.

Figure 3:
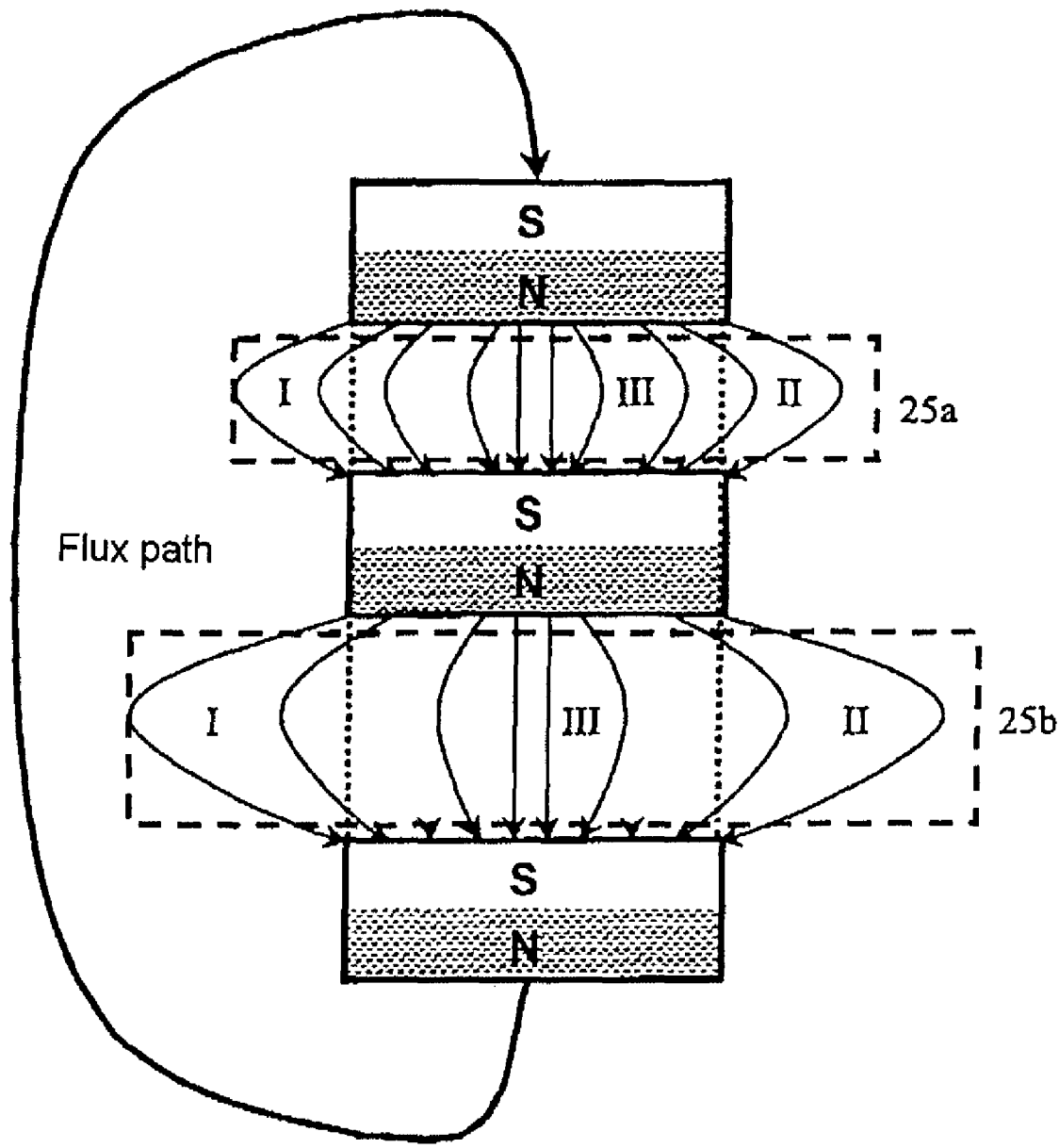
FIG. 3 shows the profile of the magnetic lines of force in the spring device as shown in FIG. 2.

FIG. 3 shows the profile of the magnetic lines of force of the arrangement as shown in FIG. 2. This figure shows the line of force profile in the gap 25a (upper gap) and the gap 25b (lower gap) including the stray flux at the edges I, II of the gaps 25a and 25b. The figure also shows that, when the magnet or pole body 3 is moved with respect to the other pole bodies, the volume or overlap volume 25a-III increases to the same extent that the overlap volume 25b-III decreases, so that the overall volume comprising the two overlap volumes remains constant. In contrast to this, the volumes I and II do not vary linearly with the position of the central pole body 3, so that, in this case, the central magnetic induction no longer remains constant. Overall, this means that, in particular as a result of this nonlinearity, the magnetic energy varies with the relative position of the pole body 2 with respect to the pole bodies 2a, 2b, thus resulting in an attraction force on the pole bodies. This means that the change in the magnetic field gradient in the gaps 25a and 25b is a significant cause, or the significant cause, of the negative stiffness of the spring device arrangement according to the invention. In this context, it should also be mentioned that the nonlinearity of the magnetic circuit according to the invention cannot be explained just by the phenomenon that has been described since, in particular, the parasitic magnetic flux through the yoke 8 also contributes to this.

The field gradient or stray flux can be influenced in particular firstly by the distance h between the poles 2a and 2b and by the geometry and/or cross section. If the parameters which have been mentioned are suitably matched, it is possible to linearize the magnetic field strength in the magnetic circuit according to the invention, and in this case the cross sections of the pole bodies are generally of different size.

FIGS. 4 and 5 show the influence of a change in the distance h between the upper pole body 2a and the lower pole body 2b on the linearity of the spring device according to the invention. FIG. 4 shows the relationship between the stiffness and the position z of the central pole body as shown in FIG. 2 or 3 with respect to the outer pole bodies 2a and 2b, starting from the rest position in the center (z=h/2) between the outer pole bodies 2a and 2b, in which the forces of attraction cancel one another out. This clearly shows that the stiffness of the spring device has an essentially constant profile in a range of approximately ±2.5 mm for a distance value of h=28 mm. This is no longer true for the said range for the distance values h=33 mm or 23 mm since, with these distances, considerable nonlinearities can be seen, in the form of curves.

FIG. 5 shows the spring force profiles, corresponding to FIG. 4, for the respective pole body separations. FIG. 5 accordingly shows a diagram which illustrates the spring force effect on the body 3 as shown in FIG. 2, as a function of the distance z to the poles of the bodies 2a and 2b. As can be seen from the curves in FIG. 5, particularly when said distance is h=28 mm, the spring device according to the invention can produce an essentially linear force effect on the magnetic body 2 in a relatively wide range.

Figure 6:
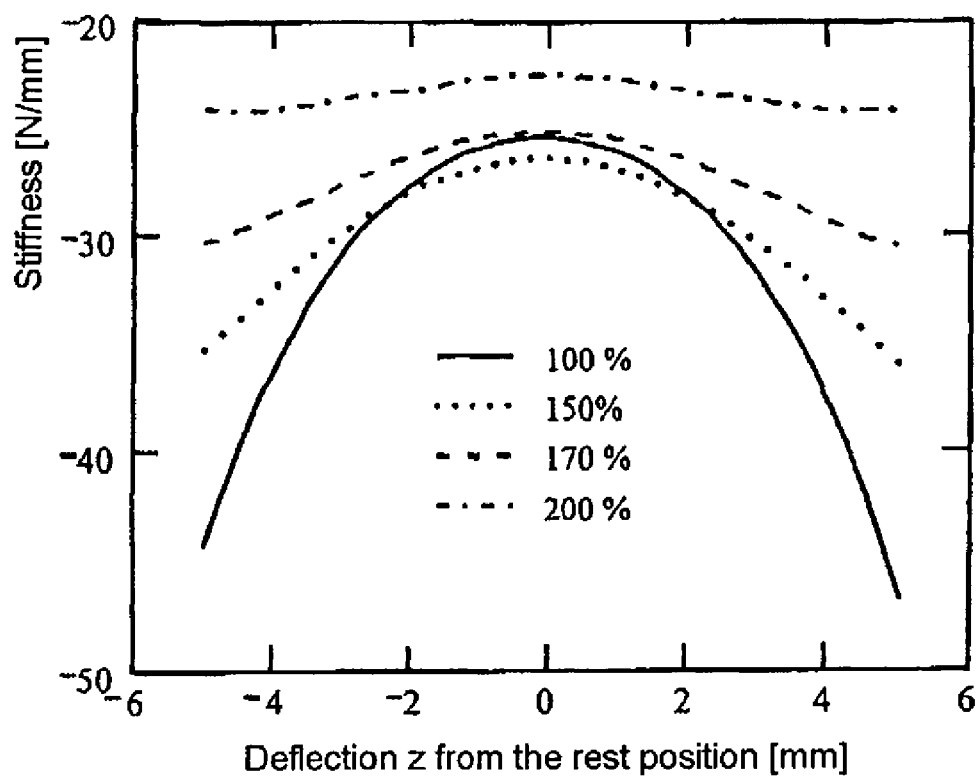
FIG. 6 shows a total of four graphs, which illustrate the relationship between the stiffness of the various cross-sectional ratios between the outer and the inner pole bodies.
Figure 9:
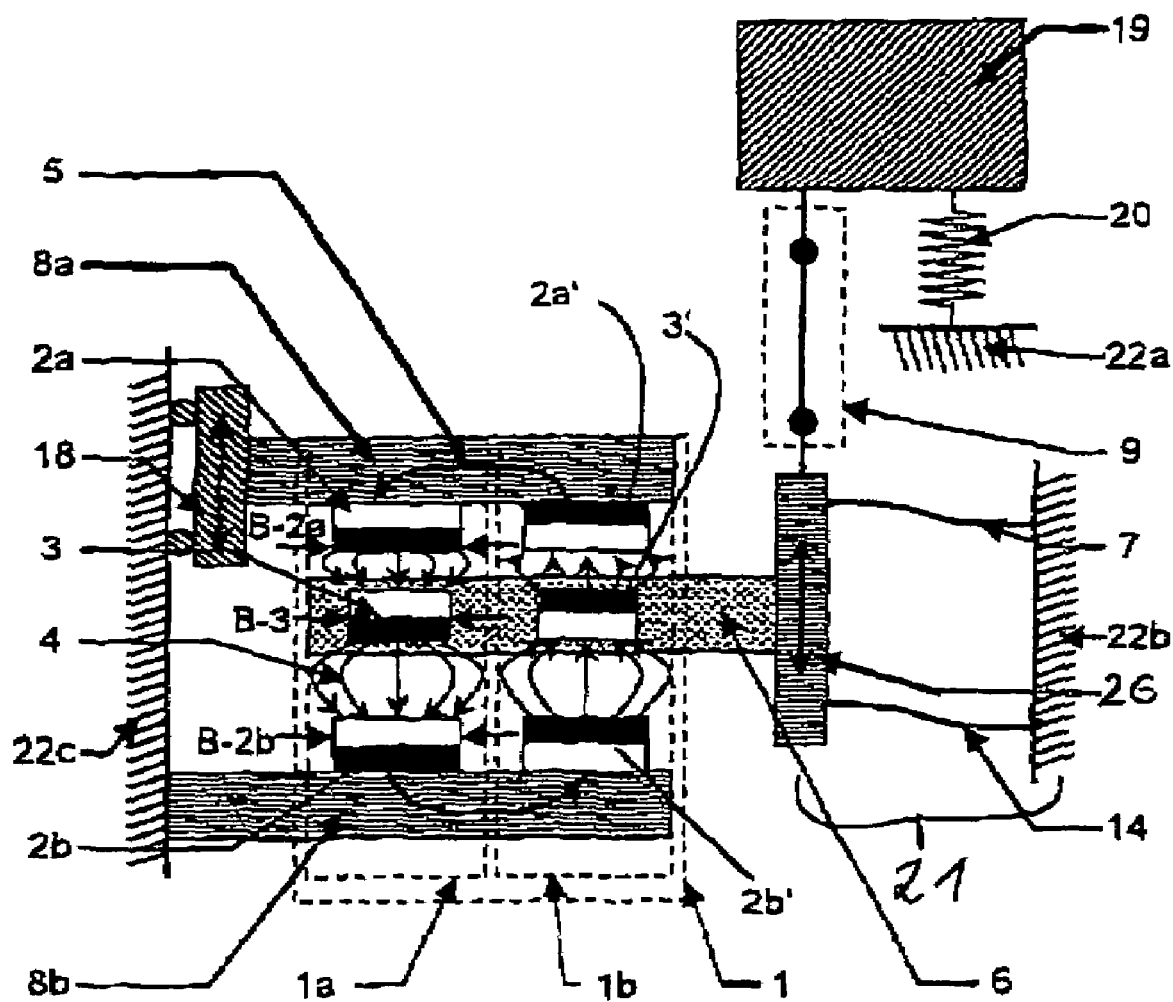
FIG. 9 shows a schematic illustration of one embodiment with opposite magnetic flux directions, in the sense of FIG. 8.

In total, FIG. 6 shows four graphs, which illustrate the relationship between the stiffness and the deflection of the second pole body 3 (FIGS. 3, 4, 9) from the rest position or operating position (equilibrium position) with respect to the outer pole bodies 2a and 2b, with the individual graphs relating to different width and/or cross-sectional ratios between the central pole body 3 and the outer pole bodies 2a and 2b (FIG. 9). The solid curve (ratio: 100%) corresponds to a width ratio for which the widths B-2a, B-2b and B-3 (FIG. 9) of the pole bodies 2a, 2b, 3 (FIG. 9) are the same. The ratio 150% relates to a situation where the outer pole bodies 2a, 2b each have a width which is 1.5 times greater than that of the central pole body 3. A corresponding situation applies to the ratios 170% (1.7 times) and 200% (twice). The graph in FIG. 6 shows that the greater the ratio between the pole bodies, the more constant is the negative stiffness over the entire range of deflection, and the lower is the absolute value of the negative stiffness. Furthermore, it should be mentioned that the curve profile of the graphs as shown in FIG. 6 is also dependent on the distance h (FIG. 2) between the outer magnets 2a, 2b. Overall, this means that both the distance between the outer magnets and the width of the pole bodies must be taken into account when optimizing the stiffness. The curve profiles shown in FIG. 6 were obtained using a model (see below) on the basis of the embodiment shown in FIG. 9. In this case, the dimensions of the second or central magnet 3 are 10×10×30 mm, that is to say it has a width B-3 of 10 mm, a length $1_{magn3}$ of 10 mm and a depth of 35 mm, and the dimensions of each of the outer magnets are a width B-2a/b between 10 and 17 mm and a length $1_{magn2a/b}$ of 7 mm and a depth of 35 mm. The nominal distance h between the outer magnets 2a and 2b was fixed at 24 mm, and the distance between each of the combinations of three magnets was fixed at 6 mm.

The knowledge gained as described above in conjunction with the invention means, in particular, that small pole bodies, in which case the outer pole bodies 2a, 2b are up to three times as large as the inner pole bodies 3, result in better characteristics in terms of linearity and stiffness than would be the case with a large pole body with the same magnetic flux density so that, in particular, the combination of pole bodies also plays a major role for the purpose of the invention.

In conjunction with the spring device according to the invention and, in particular, in conjunction with the embodiment shown in FIG. 2, it is possible to use not only permanent magnets and/or electromagnets but, with the combination options, it is also possible to use bodies which can be magnetized and are composed, for example, of soft iron, all the way through to paramagnetic materials. The following table shows various combination options for the situation in which a maximum of four poles are provided. Spring devices with more than four poles, for example in the form of the system connected in series as shown in FIG. 2 are, of course, also within the scope of the invention.

| No. | Pole body 2a | Pole body 3 | Pole body 2b | Remarks |
|---|---|---|---|---|
| 1 | Magnet | Magnet | Magnet | The three magnets have the same magnetization direction. The body 3 may be composed of two mutually independent mag-nets. |
| 2 | Magnet | Soft iron | Magnet | |
| 3 | Soft iron | Magnet | Soft iron | |
| 4 | Soft iron | Magnet | Magnet | The two magnets 3 and 2b have the same magnetiza-tion direction. |
| 5 | Magnet | Magnet | Soft iron | The two magnets 2a and 3 have the same magnetiza-tion direction. |
| 6 | Magnet | Soft iron and magnet | Magnet or soft iron | The soft iron pole body K2 must be aligned with the magnets of the bodies 3 and 2b. All he magnets must have the same magnet-ization direction. |
| 7 | Magnet or soft iron | Magnet and | Magnet | The soft iron pole body 3 must be aligned with the |

-continued

| No. | Pole body 2a | Pole body 3 | Pole body 2b | Remarks |
|---|---|---|---|---|
| | | soft iron | | magnets of the bodies 2a and 2b. All the magnets have the same magnetiza-tion direction. |

Figure 7:
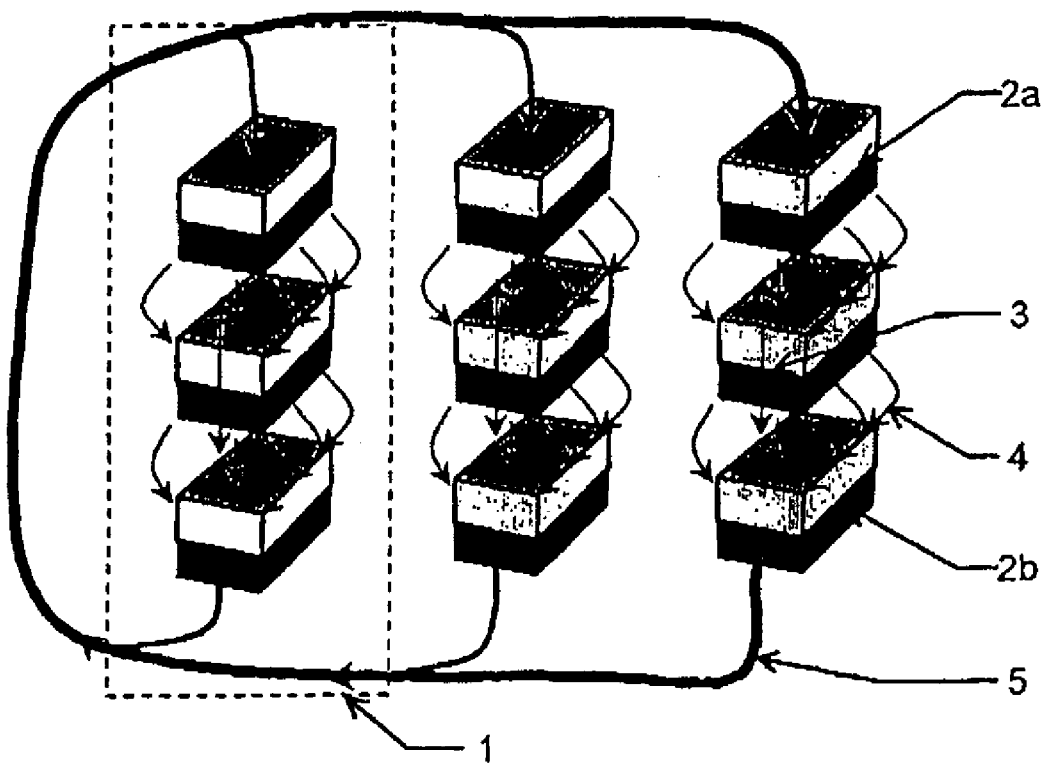
FIG. 7 shows a pole body combination according to one possible embodiment of the spring device according to the invention.
Figure 8:
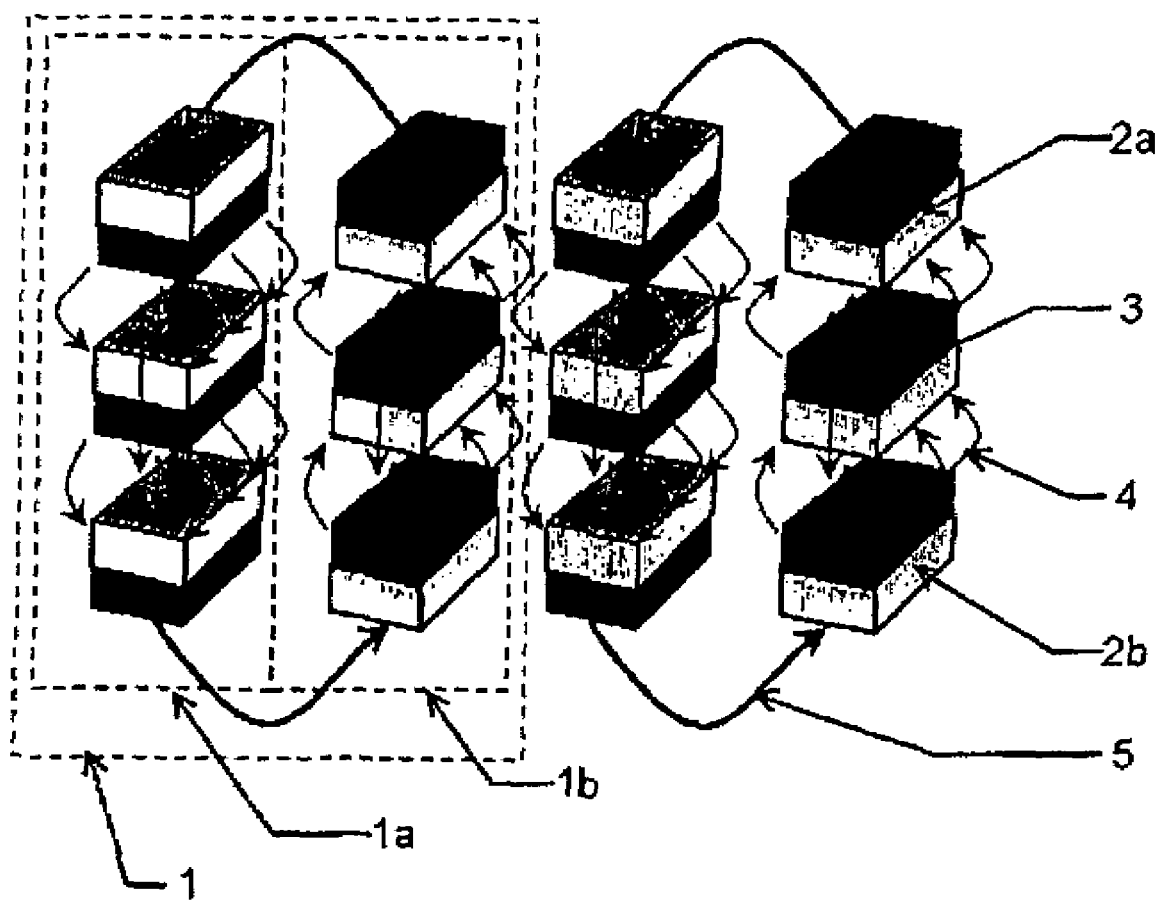
FIG. 8 shows a further pole body combination for the spring device according to the invention.

FIGS. 7 and 8 show two types of pole body combinations, by means of which the performance of the spring device according to the invention can be set on an individual basis.

FIG. 7 shows a set of pole bodies which, in total, comprises three magnetic basic cells 1 which are arranged parallel alongside one another, with each basic cell in each case containing three pole bodies 2a, 2b, 3. The magnetization of the parallel basic cells is in each case in the same direction, that is to say the magnetization directions 4 are parallel to one another. The magnetic flux 5 to be passed through a yoke is produced from all three basic cells. Since the basic cell 1 is relatively small, it is easily possible with this embodiment for the pole body set to be expanded on a specific basis by the addition of further basic cells, in order to achieve the desired stiffness for the spring device according to the invention.

In the embodiment variant shown in FIG. 8, one basic cell 1 contains a total of six pole bodies, with the basic cell 1 having subcells 1a and 1b whose pole body combination is identical to the basic cell shown in FIG. 7. The magnetic subcells are arranged with respect to one another such that the magnetization directions 4 of each of the subcells run parallel to one another, but in opposite directions. The magnetic flux 5 to be passed through a yoke is, in this embodiment, fed from the magnet lines of force which originate from the respective outer pole bodies or magnets 2a, 2b of one subcell and open into the adjacent subcell of the basic cell 1, so that the respective outer pole bodies 2a, 2b of the respective subcells 1a and 1b are connected to one another via a yoke. It is particularly advantageous with this exemplary embodiment of the invention that the magnetic flux path between the subcells 1a, 1b is comparatively small. Furthermore, high stiffnesses can be achieved easily with this configuration.

The embodiment variants shown in FIGS. 7 and 8 may, of course, also be combined with one another in order to achieve any desired negative spring stiffness.

FIG. 9 shows a development of a spring device according to the invention based on the use of one basic cell as shown in FIG. 8. A total of six permanent magnets 2a, 2b, 3, 2a', 2b', 3' are used for this purpose, and are arranged in stacks, each having three permanent magnets for each subcell 1a and 1b, alongside one another. The respective combinations 1a and 1b, each comprising three permanent magnets located one above the other, and in which opposite poles are opposite one another, have opposite magnetization directions. The magnets 2a, 2b, 3, 2a', 2b', 3' are cylindrical, with the cross section of the magnets 3 and 3' being smaller than that of the outer magnets 2a, 2b, 2a', 2b'.

In the present embodiment as shown in FIG. 9, the spring device according to the invention is used for correction of the spring 20, such that the load 19 does not perceive any spring stiffness, or perceives a considerably reduced spring stiffness.

The lower magnets 2b, 2b' are attached to the lower magnetic yoke 8b. The yoke 8b carries the lines of force 5 from the subcell 1a to the subcell 1b, and is firmly connected to the mounting wall 22c. Both the upper magnets 2a, 2a' are attached to the yoke 8a. The yoke 8a likewise carries the lines of force 5 from the subcell 1b to the subcell 1a. However, the yoke 8a is not attached directly to the mounting wall 22c, but is connected to the mounting wall 22c via a setting apparatus 18. The setting apparatus makes it possible to vary the distance between the yoke 8a and the yoke 8b, and thus also to adjust the distance between the magnets 2a, 2a' and 2b, 2b', in order in this way to adjust the magnetic stiffness.

The magnets 3, 3' in the center between the outer magnets 2a, 2a' and 2b, 2b' are firmly connected to a moving, nonmagnetic holder 6. This magnet mount can be moved up and down by means of the guidance means 21. According to the present embodiment, the guidance means 21 comprises an elastic guidance apparatus 21, which moves in a straight line and is in the form of a parallelogram. This guidance apparatus comprises two leaf springs 7 and 14. An upper leaf spring 7 and a lower leaf spring 14, which are connected on one side to the mounting wall 22b and on the other side to the rigid body 26. The guidance apparatus 21 essentially prevents any horizontal movements at right angles to the movement direction of the magnets, and essentially prevents any tilting movement. The only movement which is essentially allowed is the translation movement in the direction of the arrows that are shown.

The magnets 3, 3' that are guided in this way thus have high stiffness at right angles to the translation direction. In order to decouple the horizontal forces and movements acting on the spring device as shown in FIG. 8 from those which act on the load 19, the spring device as shown in FIG. 8 comprises a decoupling means or decoupling element 9. The decoupling element connects the moving unit formed by the spring device and comprising the magnets 3, 3', the nonmagnetic holder 6 and the guidance apparatus 21 to the load 19 in such a way that a negative stiffness acts on the load.

The negative stiffness of the basic cell 1 (FIG. 8) is greater than the stiffness of the guidance apparatus, and thus compensates for the stiffness of the spring 20.

The technical implementation of the spring device according to the invention as shown in FIG. 9 is illustrated in FIGS. 10, 11, 12 and 13.

FIG. 9 shows a cross section through the technical embodiment, corresponding to the view shown in FIG. 8. Apart from the decoupling element 9 and the connecting bracket 12, the embodiment according to the invention fits into a box whose dimensions are 107×79×75 mm (width× length×depth). The dimensions of the outer magnets 2a, 2b, 2a', 2b' are 7×14×35 mm (width (B)×length (1)×depth), and the dimensions of the central magnets 3, 3' are 10×10×30 mm (width×depth×height). This means that the width ratio is 143%. The magnets are GSN-40, neodymium magnets.

The stiffness of the spring device illustrated in FIG. 9 can be varied in a range between −16 N/mm and −38 N/mm.

The setting apparatus for adjusting the distance between the magnets 2a, 2a' and 2b, 2b' includes the sliding guidance of the upper yoke between the side plates 10a and 10b. The side plates are equipped with slot openings for this purpose. The lower yoke 8b has a number of holes for attachment of the yoke and/or of the spring device. The magnet mount 6 in the present embodiment comprises a magnet holder 6b and a closure part 6a. These completely surround the magnet 3. The magnet mount is manufactured from a nonmagnetic material.

Figure 10:
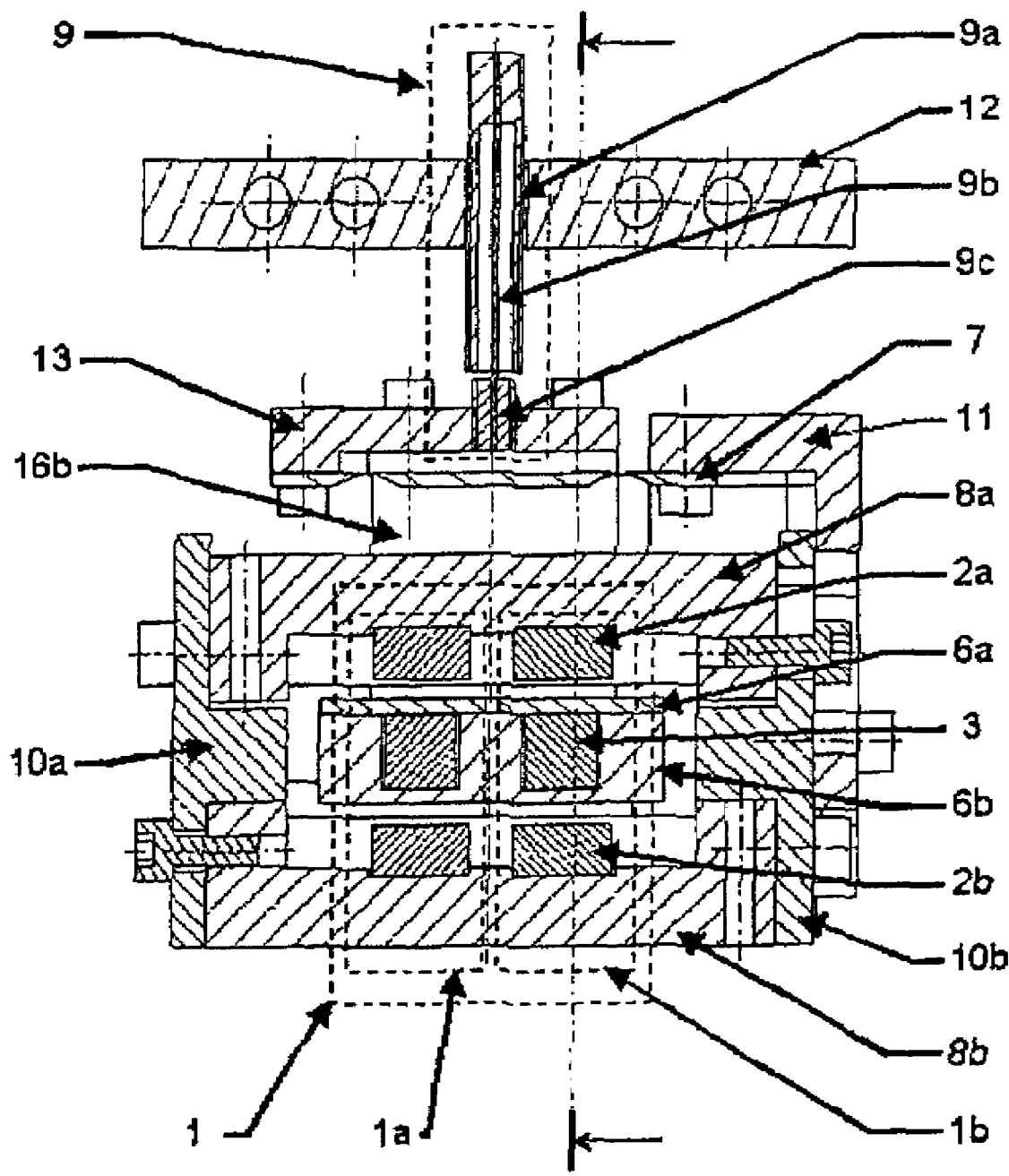
FIG. 10 shows a cross section of the technical implementation of the embodiment as shown in FIG. 9.

The elastic parallel guidance 21 can be seen only partially in the section view shown in FIG. 10. In this case, only the upper leaf spring 7 can be seen. The lower leaf spring 14 can be seen in FIG. 11. This is spliced and is located on the outside of the spring device. The two spliced parts of the leaf spring 14 are identified by the reference numbers 15a and 15b in FIG. 10. The spliced leaf spring 14 can be seen even better in the external views of the embodiment shown in FIGS. 12 and 13.

Figure 11:
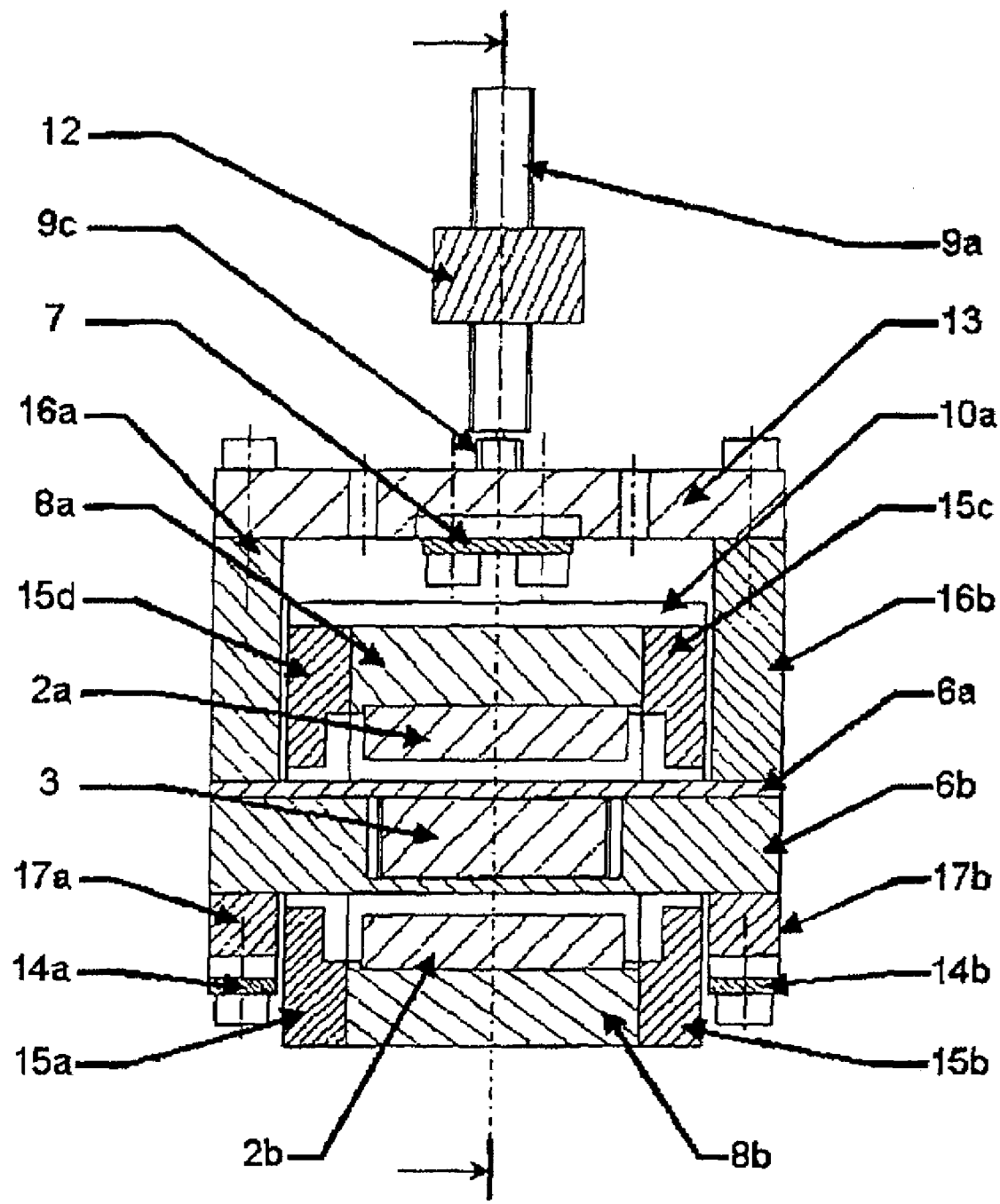
FIG. 11 shows a further cross section of the technical implementation of the embodiment as shown in FIG. 9.
Figure 12:
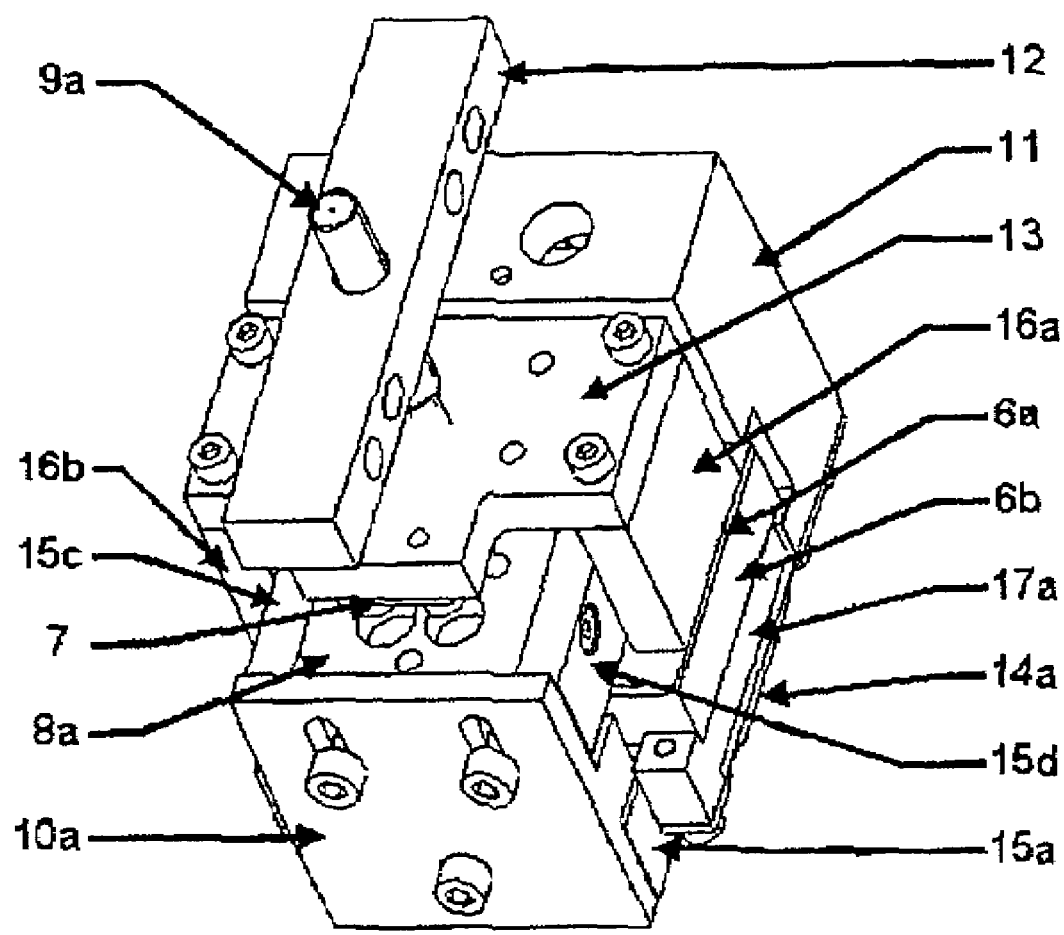
FIG. 12 shows a three-dimensional illustration of the embodiment as shown in FIGS. 9, 10 and 11.

In the embodiment variant shown in FIG. 10 or 11, the rigid body 26 (FIG. 9) is formed by the spring device parts identified by the reference numbers 13, 16a, 16b, 6a, 6b, 17a and 17b. In this case, the lower leaf spring 14 is attached at the points 14a, 14b. The other end of the leaf springs is, in contrast, connected to the cover 11. This corresponds to the attachment to the mounting wall 22b in conjunction with FIG. 9, since the cover 11 is for its part in turn connected to the side plate or mounting wall 10b. The cover can be moved somewhat over the plate 10b, in order in this way to allow the spring parallelogram to be adjusted.

The coupling means 9 is composed of three parts. The wire spring 9b is one of the important parts. The wire spring 9b is connected to a sleeve 9a and to the plug 9c. In this case, the decoupling at right angles to the movement direction of the pole bodies is ensured by the bending capability of the wire spring 9b. The level of the decoupling unit 9 with respect to the connecting bracket 12 can be adjusted by means of a screw thread in the sleeve 9a.

In order to ensure that the magnetic fields produced in the spring device according to the invention do not penetrate the exterior, the spring device is provided with additional shielding strips 15a, 15b, 15c and 15d.

Figure 13:
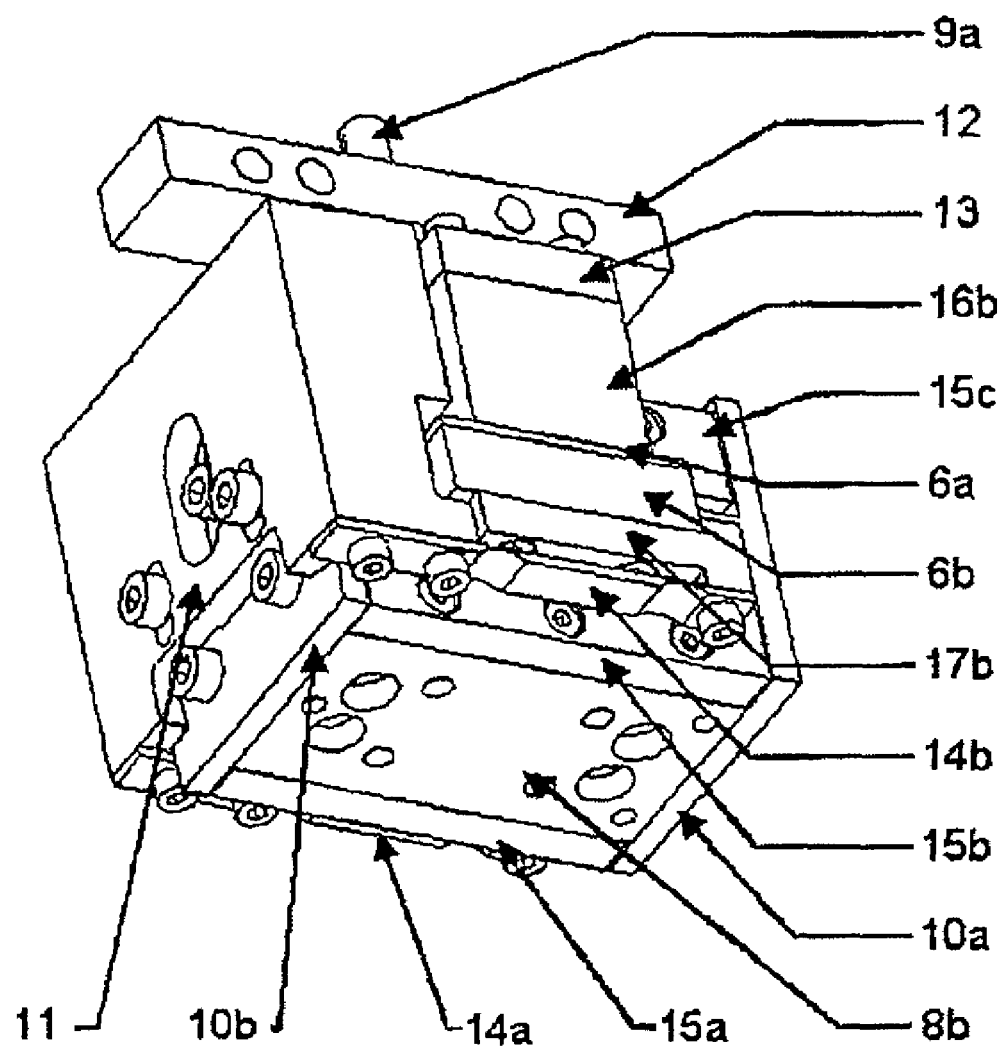
FIG. 13 shows a further three-dimensional illustration of the embodiment as shown in FIGS. 9, 10 and 11.

The three-dimensional view in FIG. 13 of the embodiment shown in FIGS. 9, 10 and 11 also shows the lower part of the spring device. This also shows, by way of example, the threaded holes in the lower yoke 8b, via which the spring device can be attached in a simple manner.

Figure 14:
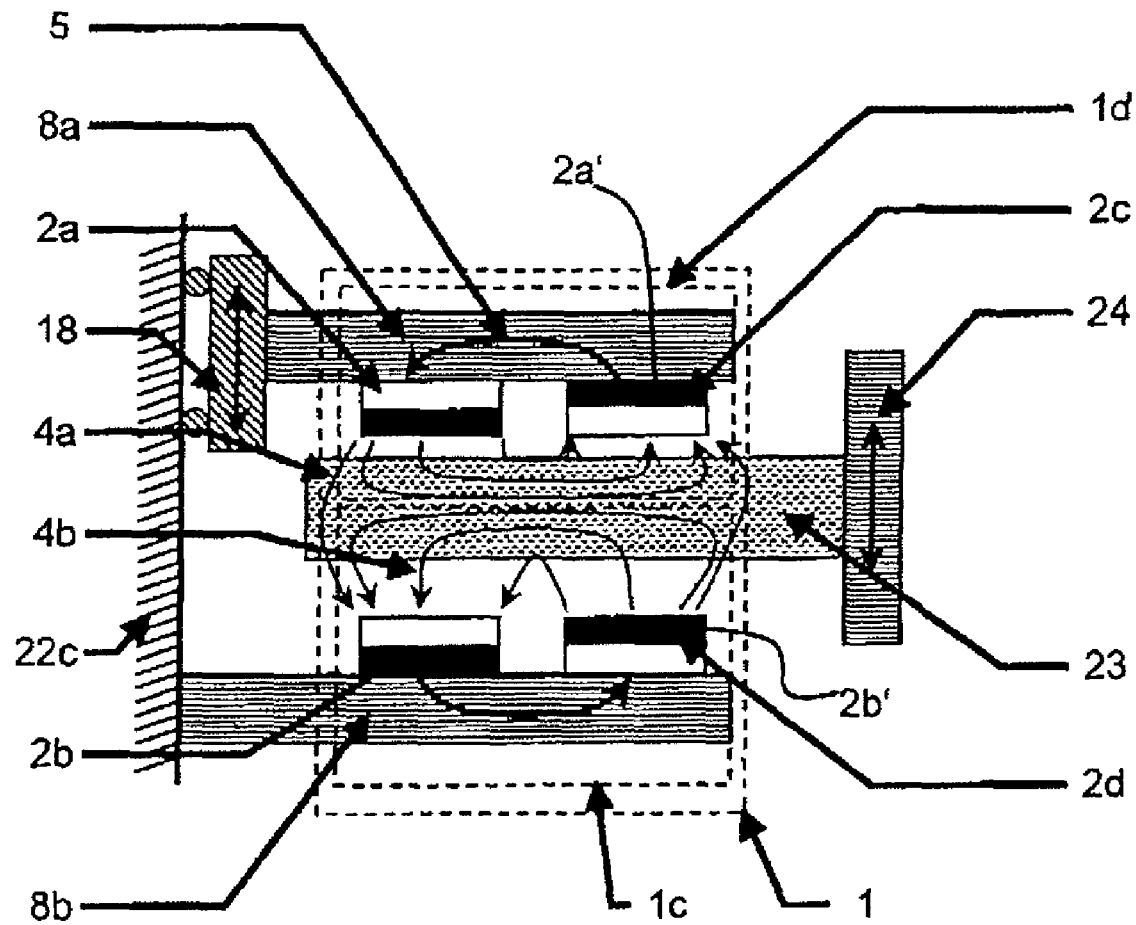
FIG. 14 shows a schematic illustration of a second embodiment of the invention, in which one pole body comprises a soft iron part.
Figure 15:
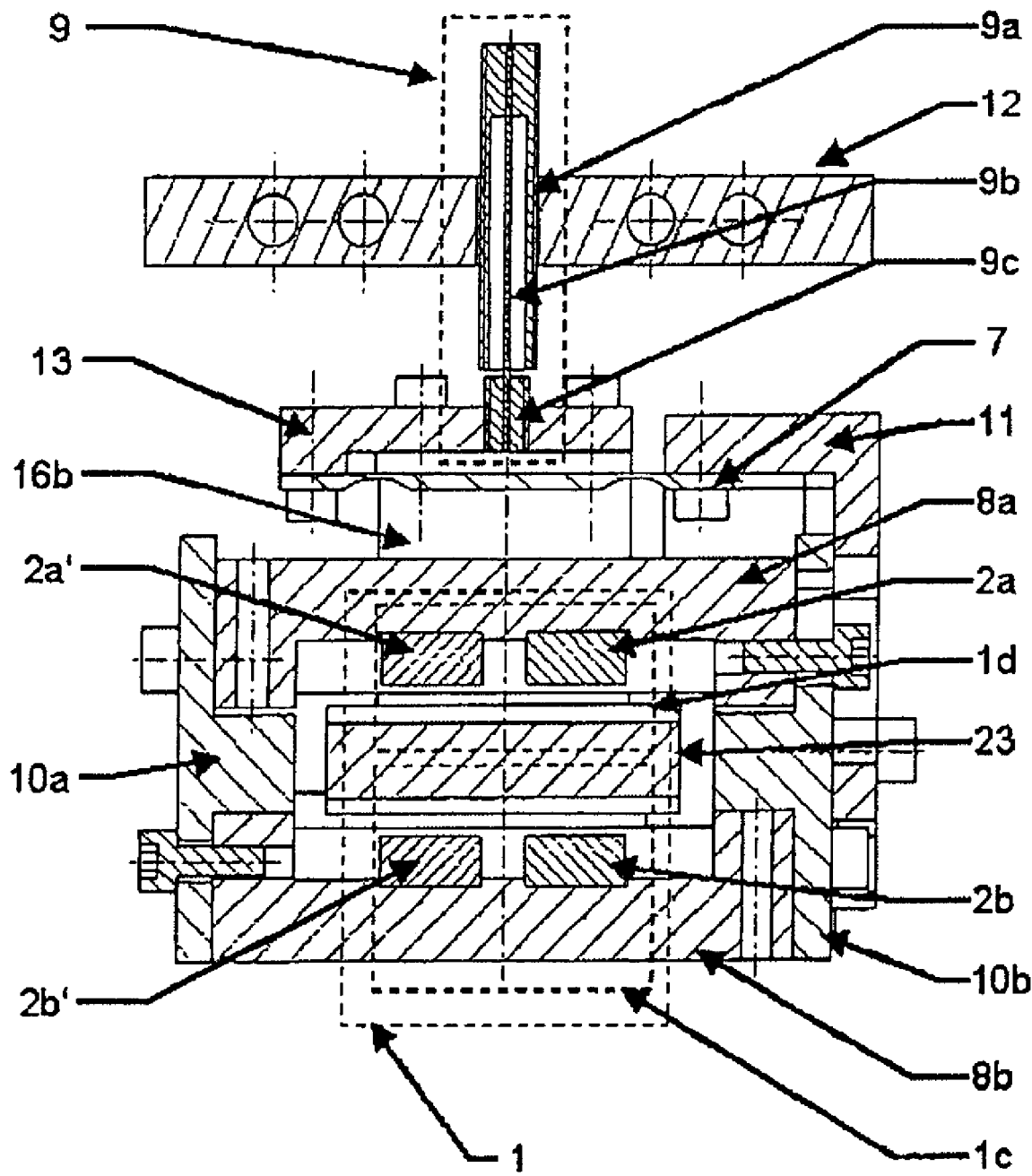
FIG. 15 shows a cross section through the technical implementation of the embodiment shown in FIG. 14.

FIGS. 14 and 15 show one further possible embodiment according to the invention.

In this case, FIG. 14 shows a schematic view of the further variant. In the exemplary embodiment shown in FIG. 14, the two magnets 3 and 3' and the nonmagnetic mount 6 have been replaced by the soft iron part 23, in comparison to the embodiment shown in FIG. 9. As can be seen from FIG. 14, this changes the line of force profile between the magnets 2a, 2b and 2a', 2b' and the soft iron part 23. The lines of force now no longer run essentially vertically, that is to say along the movement direction of the pole body combination, but essentially at right angles to the movement direction, so that the magnetic subcells 1c and 1d of the magnetic basic cell 1 are no longed oriented vertically, but horizontally.

In FIG. 9, the lines of force 4 run from the upper magnet 2a to the central magnet 3 to the lower magnet 2b through the flux path 5 of the lower yoke 8b, and then pass upward through the magnets of the subcell 1b, via the flux path 5 in the upper yoke 8b back to the upper magnet 2a again. There are two main paths in the arrangement shown in FIG. 14.

The first flux path 4a runs from the upper magnet 2a directly through the soft iron part in the central part of the pole body arrangement to the lower magnet 2b, and then continues through the flux path 5 in the lower yoke 8b to the magnet 2b', and from there upward through the soft iron part 23 to the upper magnet 2a', and through the upper yoke 8a back to the upper magnet 2a.

The second magnetic flux path corresponds to the path between the two upper magnets 2a and 2a' and the two lower magnets 2b and 2b'. The second flux path will be more important than the first, depending on the dimensions of the pole body combination. The subcells are therefore oriented more strongly horizontally in the [lacuna] according to the exemplary embodiment. The advantages of the spring device shown in FIG. 14 are, in particular, that fewer permanent magnets need be used, and the production of the spring device thus costs less. Furthermore, the system shown in FIG. 14 is insensitive to horizontal movements of the soft iron part 23 in the center of the pole body combination. This is because, particularly when the soft iron part is comparatively large with respect to the magnets, the field between the magnets and the soft iron part will not change, and no horizontal forces will therefore be produced when the soft iron part carries out a horizontal movement. As a result of this, the embodiment shown in FIGS. 14 and 15 requires less stiff vertical guidance 24 of the soft iron part 23, so that, for example when the load to be isolated itself has good guidance and is insensitive to horizontal forces and movements, the moving soft iron part can be connected directly to the load, with no horizontal decoupling being required.

FIG. 15 shows one practical implementation of the spring device according to the invention and as shown in FIG. 14, with a soft iron part.

The cross section illustrated in FIG. 15 is very similar to the cross section shown in FIG. 10. The difference is that the magnets 3 and 3' and the magnet mount 6 with its parts 6a and 6b have been replaced by a soft iron part 23.

The soft iron part is installed between the four magnets 2a, 2b and 2a', 2b' such that it can move in the vertical direction. The upper magnetic subcell id comprises the magnets 2a and 2a', with the magnet 2a being magnetized in the downward direction and the magnet 2a' being magnetized in the upward direction, and the lower magnetic subcell 2c comprises the magnets 1b and 1b'. To this extent, reference is also made to FIG. 9.

The configuration shown in FIG. 15 does not make use of the described tolerance of the soft iron part in the horizontal direction. In fact, the part 23 is prevented from moving horizontally by elastic parallelogram guidance, which contains two leaf springs 7 and 14 or 14a and 14b and, furthermore, comprises a rigid part formed by the parts 13, 16a, 16b, 17a and 17b. A decoupling element 9 is also required here, owing to the strong horizontal stiffness of the spring device.

The advantage of a configuration of the spring device with the elastic parallelogram guidance and with the decoupling element 9 is that no additional requirements need be placed on the vertical guidance of the load.

The spring devices according to the invention with negative stiffness are used in conjunction with an air spring, for example, for oscillation isolation of a microscope or of any other apparatus which is sensitive to oscillations, so that it is possible to reduce the natural frequencies of the isolation system, hence effectively improving the oscillation isolation.

I claim:

1. A load supporting system comprising spring means having a positive spring stiffness and including a magnetic spring device that comprises:
   a first row with at least one magnet,
   a second row with at least one second magnet,
   a third row with at least one third magnet;
   each said magnet having magnetic poles of different polarities;
   said first, second and third magnets being arranged to form a magnet combination with magnetic poles of different polarities being opposite to one another and developing a magnetic flux therebetween;
   said first and second magnets taking a distance from one another in a predefined range with a volume therebetween;
   said third magnet being arranged in said volume;
   guiding means connected to said third magnet so as to guide same in said volume parallel to said magnetic flux;
   connecting means for connecting said guiding means to a load to be supported by said spring means having a positive spring stiffness;
   said magnetic spring device being constructed to develop an essentially constant negative stiffness when said third magnet moves parallel to said magnetic flux so as to lower said positive spring stiffness of said spring means.

2. The load supporting system of claim 1 wherein said first and second magnets comprise a pole body having a first cross section and said third magnet comprises a pole body having a second cross section, said first to said second cross section having a ratio in the range of 1 to 3.

3. The load supporting system of claim 1 wherein said ratio is 1.4.

4. The load supporting system of claim 1 wherein said first, second and third rows of magnets comprise permanent magnets.

5. The load supporting system of claim 1 wherein said first and second rows of magnets comprise permanent magnets and said third row of magnets comprise a soft iron part.

6. The load supporting system of claim 1 wherein said magnet spring device comprises a housing having an interior cavity to contain said magnets, and an opening to said cavity to provide a passage for said connecting means, said connecting means being coupled to said guiding means of said third magnet so as to move same parallel to said magnetic flux.

7. The load supporting system of claim 1 wherein said guiding means comprises leaf springs arranged in a parallelogram.

8. The load supporting system of claim 1 wherein said connecting means comprises a coil wire spring arranged in a sleeve.

9. The load supporting system of claim 1 further comprising shielding means surrounding said magnets.

10. The load supporting system of claim 1 further comprising means for settling said distance between said first and second magnets to a predefined value.

11. The load supporting system of claim 10 wherein said predefined value is one in a range between 23 mm and 33 mm.

12. The load supporting system of claim 9 wherein said. predefined distance has a value of 28 mm.

13. The load supporting system of claim 1 further comprising a control device.

14. The load supporting system of claim 1 wherein said spring having a positive spring stiffness comprises one of mechanical, pneumatical, hydraulical and electromechanical spring means.

15. The load supporting system of claim 1 which is formed as an oscillation isolation device for said load.

16. The load supporting system of claim 1 wherein a plurality of magnetic spring devices are provided.

* * * * *